(12) United States Patent
Kawai et al.

(10) Patent No.: US 8,128,232 B2
(45) Date of Patent: Mar. 6, 2012

(54) VISIBLE IN-VEHICLE LASER BEAM PROJECTOR PROVIDING VARIABLE PROJECTION REGION AS FUNCTION OF SEATBELT FASTENING STATUS

(75) Inventors: Seiji Kawai, Aichi-gun (JP); Yoshihisa Sato, Nagoya (JP); Kenichi Mori, Suzuka (JP); Hidehiko Kawakami, Nagoya (JP); Tetsuya Enokizaka, Nagoya (JP)

(73) Assignee: Denso Corporation, Kariya, Aichi-Pref. (JP)

( * ) Notice: Subject to any disclaimer, the term of this patent is extended or adjusted under 35 U.S.C. 154(b) by 0 days.

(21) Appl. No.: 13/064,427

(22) Filed: Mar. 24, 2011

(65) Prior Publication Data
US 2011/0210839 A1 Sep. 1, 2011

Related U.S. Application Data

(62) Division of application No. 12/071,212, filed on Feb. 19, 2008, now abandoned.

(30) Foreign Application Priority Data

Feb. 19, 2007 (JP) .................. 2007-37484

(51) Int. Cl.
*G03B 21/00* (2006.01)
(52) U.S. Cl. .......................... 353/12; 353/13
(58) Field of Classification Search .............. 353/12–14; 340/441
See application file for complete search history.

(56) References Cited

U.S. PATENT DOCUMENTS

| 4,564,917 | A | 1/1986 | Yamada et al. | |
|---|---|---|---|---|
| 7,131,728 | B2 | 11/2006 | Nambudiri et al. | |
| 7,275,831 | B2 | 10/2007 | Knoll et al. | |
| 2006/0108167 | A1* | 5/2006 | Finger | 180/268 |
| 2006/0209419 | A1 | 9/2006 | Dobschal et al. | |
| 2006/0250226 | A1* | 11/2006 | Vogel et al. | 340/441 |
| 2008/0079753 | A1* | 4/2008 | Victor et al. | 345/660 |

FOREIGN PATENT DOCUMENTS

| DE | 103 34 720 A1 | 3/2005 |
|---|---|---|
| JP | 09-185012 A | 7/1997 |
| JP | 09-210716 | 8/1997 |
| JP | 2003-165404 | 6/2003 |
| JP | 2004-505315 | 2/2004 |
| JP | 2004-262363 | 9/2004 |
| WO | 2008/087832 | 7/2008 |

OTHER PUBLICATIONS

U.S. Appl. No. 12/055,736 of MORI filed Mar. 26, 2008; corresponds to JP Appln. No. 2007-78530.
U.S. Appl. No. 12/055,710 of MORI filed Mar. 26, 2008; corresponds to JP Appln. No. 2007-81202.
U.S. Appl. No. 12/149,146 of MORI filed Apr. 28, 2008; corresponds to JP Appln. No. 2007-141476.
PCT/JP2007/074637 of SATO filed Dec. 21, 2007; corresponds to JP Appln. No. 2007-9865.

* cited by examiner

*Primary Examiner* — Thanh X Luu
(74) *Attorney, Agent, or Firm* — Nixon & Vanderhye PC (57) ABSTRACT

A projector projects a visible laser beam onto a region of a vehicle compartment. A control unit controls a direction of projecting the visible laser beam to provide information to at least one occupant in the compartment. The control unit expands the region of an object to which the visible laser beam is projected when the seatbelt has been fastened.

4 Claims, 9 Drawing Sheets

VISIBLE IN-VEHICLE LASER BEAM PROJECTOR PROVIDING VARIABLE PROJECTION REGION AS FUNCTION OF SEATBELT FASTENING STATUS

CROSS REFERENCE TO RELATED APPLICATIONS

This application is a Divisional of application Ser. No. 12/071,212, filed Feb. 19, 2008, the entire contents of which are hereby incorporated by reference into this application. This application is also based on and claims priority to Japanese Patent Application No. 2007-37484 filed on Feb. 19, 2007, the contents of which are hereby incorporated in their entirely herein by reference into this application.

FIELD OF THE INVENTION

This invention relates to a visible laser beam projector for projecting a visible laser beam in a passenger compartment of a vehicle to provide information to a passenger in the passenger compartment.

BACKGROUND OF THE INVENTION

It is known to draw a picture on a road surface by projecting a visible laser beam from a front end of a vehicle onto the road surface (for example, JP 9-210716A).

If it is attempted to provide information to a passenger aboard a vehicle by projecting a visible laser beam not to the outside of the vehicle but to a specified portion in an inside of a passenger compartment of the vehicle, it will be necessary to intensify the visible laser beam to such a degree as to maintain visibility of the visible laser beam in the compartment even under a condition where sunlight or the like light is incident to the compartment from the outer side. However, a highly intense visible laser beam will have to be limited, because it will cause damage to the retinas of the passenger if such an intense laser beam happens to directly fall on the human eyes.

SUMMARY

It is therefore an object of the present invention to maintain high the intensity of a visible laser beam while at the same time suppressing the probability of an adverse effect of the visible laser beam on human eyes in projecting the visible laser beam onto a portion in a passenger compartment of a vehicle to provide information to a passenger in the compartment.

According to the present invention, a visible laser beam projector includes a projector for projecting a visible laser beam onto a region of a vehicle compartment, and a control unit for controlling a direction of projecting the visible laser beam to provide information to at least one occupant in the compartment. The control unit expands the region of an object to which the visible laser beam is projected, when a seatbelt of the vehicle has been fastened.

BRIEF DESCRIPTION OF THE DRAWINGS

The above and other objects, features and advantages of the present invention will become more apparent from the following detailed description made with reference to the accompanying drawings. In the drawings.

DETAILED DESCRIPTION OF THE PREFERRED EMBODIMENTS

First Embodiment

Figure 1:
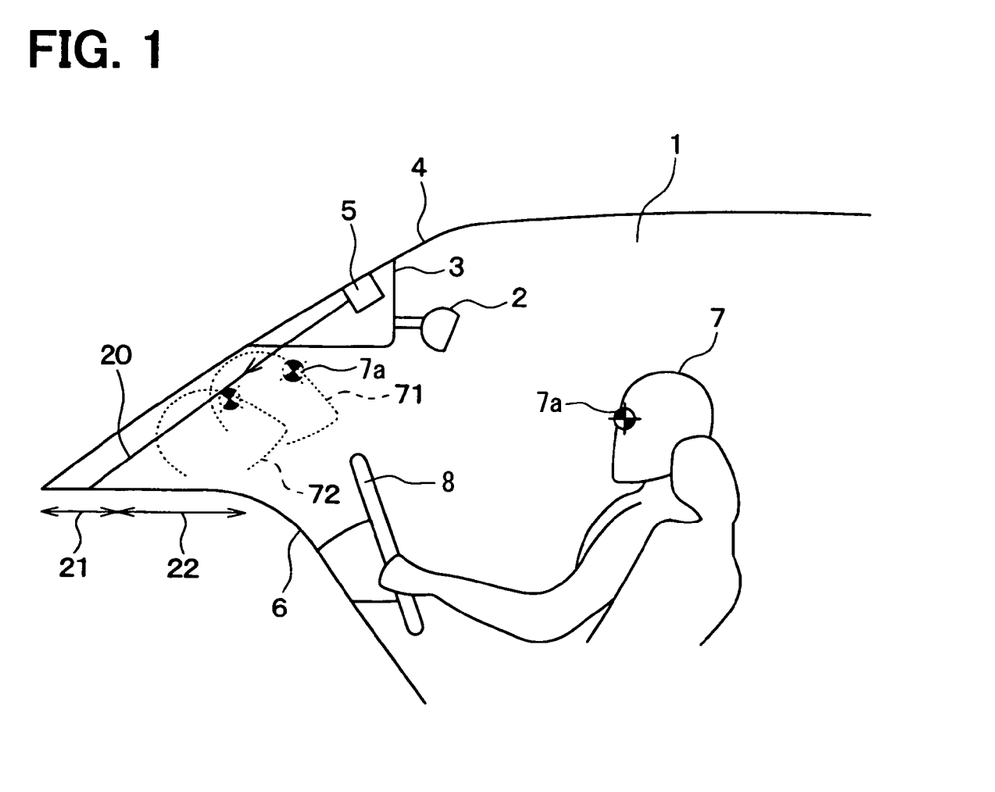
FIG. 1 is a side view schematically illustrating an arrangement of a visible laser beam projector in a passenger compartment according to a first embodiment of the present invention.

Referring first to FIG. 1, in a passenger compartment 1 of a vehicle an inner mirror (rear-view mirror) 2 is disposed at a central portion in the compartment 1 in the right-and-left direction (vehicle width direction), so that a driver 7 can confirm the rear view.

A visible laser beam projector 5 is disposed on the back side of the inner mirror 2 as viewed from the driver 7. Therefore, the visible laser beam projector 5 is disposed in front of the inner mirror 2 in the compartment. More specifically, the visible laser beam projector 5 is arranged slightly over the inner mirror 2 and between the inner mirror 2 and a windshield 4. The visible laser beam projector 5 is attached to the windshield 4 on the inner side surface of the compartment 1.

The visible laser beam projector 5 is for projecting a visible laser beam onto a specified portion in the compartment 1 for providing information to a passenger such as the driver 7 in the compartment. The intensity of the visible laser beam projected from the visible laser beam projector 5 is set to such a level that the visibility of the visible laser beam can be maintained despite of light falling and incident from the exterior of the vehicle in the daytime. A visible laser beam that falls on the human eyes may adversely affect the retinas and it is desired to decrease the probability of incidence of visible laser beam on the human eyes.

The bottom portion and side portions of the visible laser beam projector 5 are covered with a covering 3. The covering 3 is made of, e.g., transparent resin material, that transmits the visible laser beam projected from the visible laser beam projector 5. The bottom surface of the covering 3 is arranged at a position the same as, or higher than, the lower end of the inner mirror 2, and at a position lower than a position where the visible laser beam is projected from the visible laser beam projector 5 maintaining a space therebetween.

The visible laser beam is projected along an optical path 20, which is nearly in parallel with the windshield 4. The visible laser beam projector 5 is configured to project the visible laser beam onto an upper front end portion 21 and an upper middle to rear portion 22 on the upper or top surface of an instrument panel (dashboard panel) 6 in the front-rear direction (longitudinal or travel direction) of the vehicle.

Figure 2:
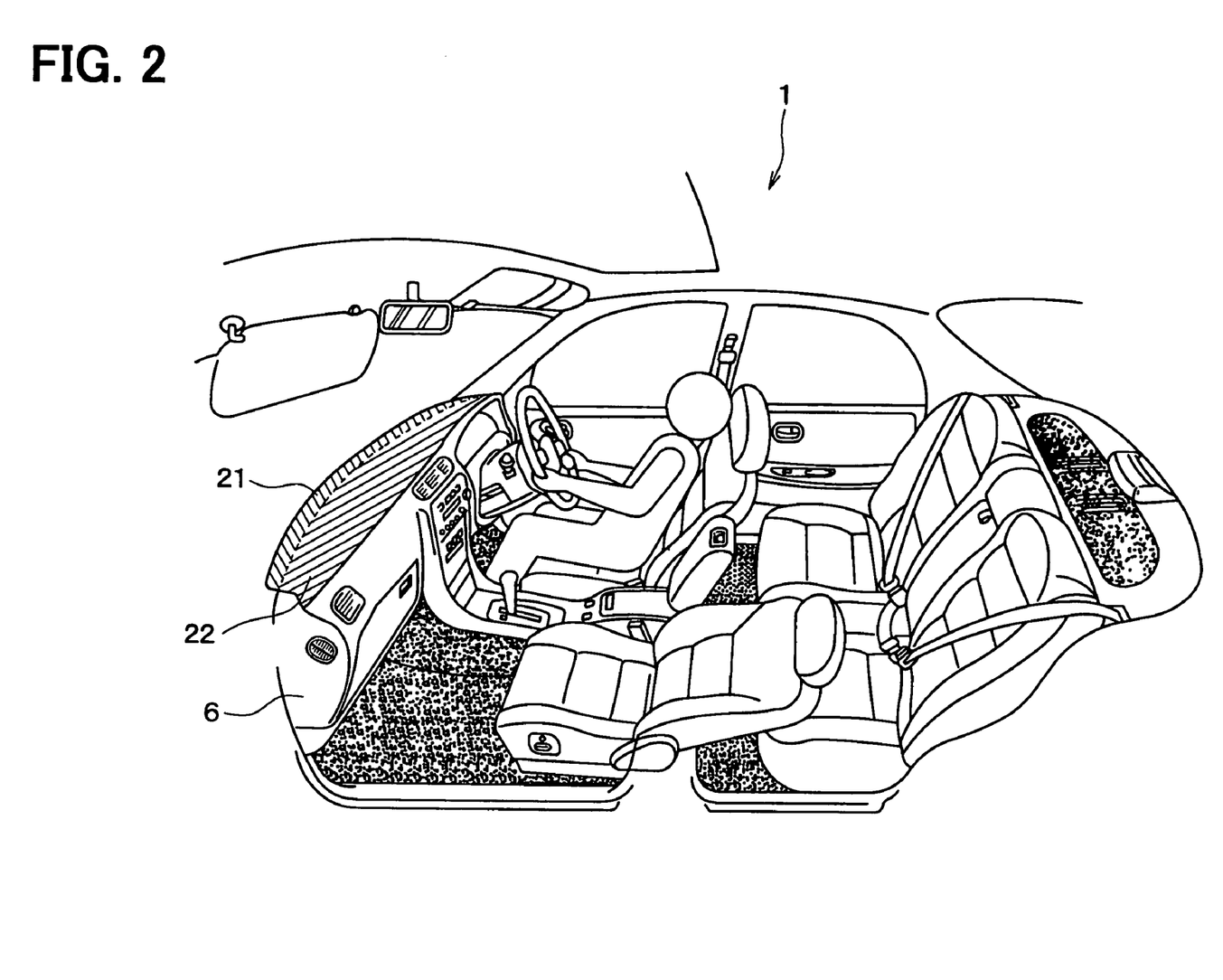
FIG. 2 is a perspective view showing ranges of an upper front end portion and an upper middle to rear portion of an instrument panel in the passenger compartment.

Ranges of the upper front end portion 21 and the upper middle to rear portion 22 are shown in FIG. 2. The upper front end portion 21 is a region very close to the windshield 4 (e.g., within 10 cm from the windshield 4) on the upper surface of the instrument panel 6. The upper middle to rear portion 22 is a portion other than the upper front end portion 21, i.e., a portion that follows the upper front end portion 21 on the upper surface of the instrument panel 6.

When the visible laser beam is projected onto the upper front end portion 21 from the visible laser beam projector 5, it is almost impossible to so place a human head that the human eyes 7a are placed in the optical path 20 of the visible laser beam as shown by virtual head images 71 and 72 in FIG. 1.

Figure 3:
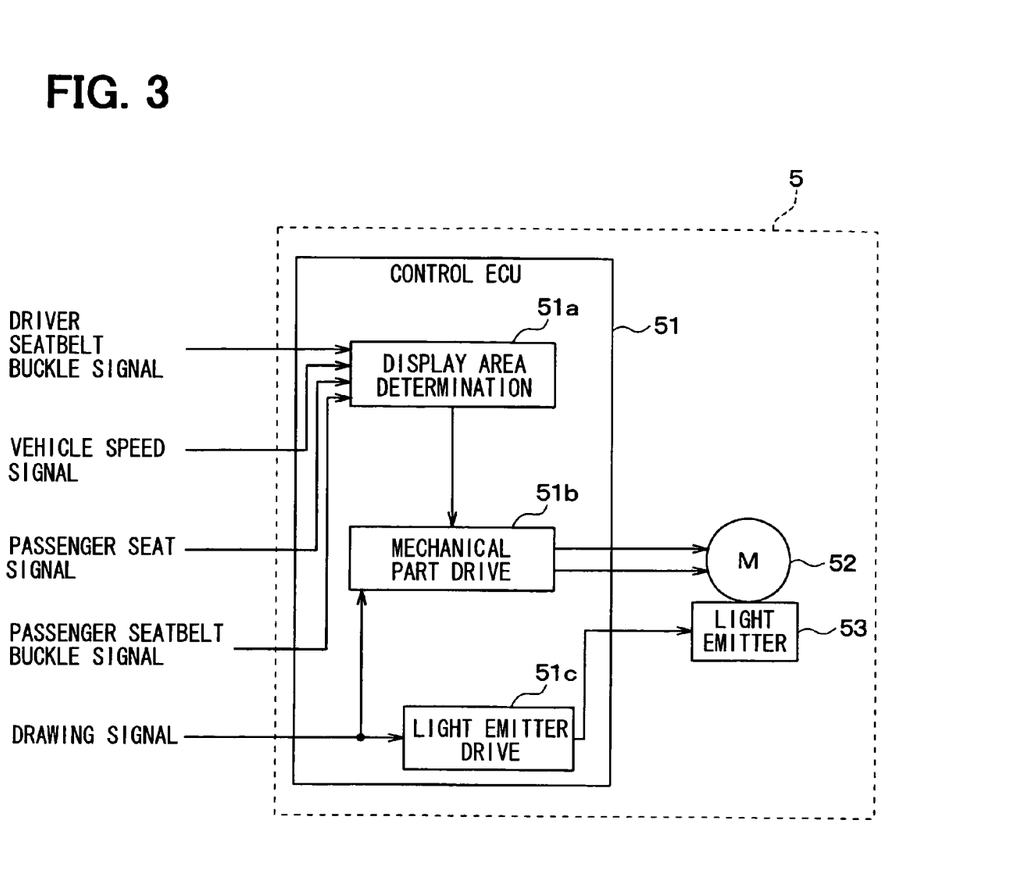
FIG. 3 is a block diagram illustrating the visible laser beam projector of the first embodiment.

As shown in FIG. 3, the visible laser beam projector 5 includes a control ECU 51, a motor 52 and a light emitter 53.

The motor 52 is rotatable in response to control signals from the control ECU 51 to adjust the light projection direction (e.g., center of the upper front end portion 21, right end of the upper front end portion 21, etc.) of the light emitter 53.

The light emitter 53 generates the visible laser beam and projects the generated beam in a direction in which the light emitter 53 is directed. The light emitter 53 can indicate a region of light (light region) having an expansion including not only one light spot but also a plurality of light spots. The light region may be, for example, a figure or a character. In order to display the character or figure in a direction of the light emitter 53 controlled by the motor 52, the light emitter 53 may employ a known device for drawing the light region, such as a known MEMS (micro-electromechanical system) resonance mirror or a DMD (digital micro-mirror device). A device using the MEMS resonance mirror may be an ECOS-CAN (registered trademark) of Nihon Shingo Co. Further, a device using the digital micro-mirror device may be a digital projector of the DLP (registered trademark) system of Texas Instruments Co. of U.S.A.

The control ECU 51 controls, upon receipt of signals from various units in the vehicle, operations of the motor 52 and the light emitter 53 based on the contents of the received signals. The control ECU 51 may be realized by, for example, a microcomputer equipped with a CPU, a RAM, a ROM and a flash memory (not shown). The signals which the control ECU 51 receives may be, for example, a driver seatbelt buckle signal, a vehicle speed signal from a vehicle speed sensor, a front passenger seat signal, a front passenger seatbelt buckle signal, a drawing signal, etc. as shown in FIG. 3. The passenger seat signal and the passenger seatbelt buckle signal may be generated when a front passenger (assistant driver) seats at the right or left side of the driver and fasten a seatbelt. Seatbelts restrict a driver and a front passenger next to the driver from moving, for instance, moving heads forward toward the windshield 4, respectively.

The driver seatbelt buckle signal is a detection signal for detecting if the seat buckle of the driver seat is fitted to a driver seat buckle holder, i.e., for detecting if the seatbelt of the driver seat is fastened. The passenger seat signal is a detection signal from a seat sensor for detecting if the passenger is seated on the passenger seat. This sensor may be a pressure-sensitive sensor embedded, for example, in the passenger seat.

The passenger seatbelt buckle signal is a detection signal from a known sensor for detecting if the seat buckle of the passenger seat is fitted to a passenger seat buckle holder, i.e., for detecting if the seatbelt of the passenger seat is fastened.

The drawing signal is for instructing in which mode the visible laser beam is to be projected. A drawing instruction device (not shown) for producing the drawing signal receives signals from various portions of the vehicle through cables or wirelessly, determines what kind of information be provided to the passenger based on the signal that is received, determines the mode of projecting the visible laser beam based on the determined content of display, and outputs the determined mode of projection.

The signals to be received from various portions of the vehicle will be, for example, signals from various sensors and operation switches, as well as a signal from a vehicle navigation device. The signal from the vehicle navigation device may be, for example, a signal representing a direction for turn-by-turn. The turn-by-turn is a function for displaying a figure (e.g., a figure of arrow) for instructing the driver to turn to the right or to the left at the next intersection every time when the vehicle approaches the intersection where the vehicle is to turn to the right or the left, so that the vehicle is guided to travel along an optimum route up to a destination as determined by the vehicle navigation device. Preferably, the vehicle navigation device outputs, to a draw instruction device, a signal indicating a turning direction which must be shown for the turn-by-turn. Then, the draw instruction device outputs to the control ECU 51 a drawing signal, which so instructs as to display a figure corresponding to the direction represented by the above signal.

From a functional point of view, the control ECU 51 includes a display area determination unit 51a, a mechanical part drive unit 51b and a light emitter drive unit 51c. If the control ECU 51 is a microcomputer, predetermined programs may be read out and executed to realize their functions of these units. Further, the control ECU 51 may have dedicated IC chips for each of these functions.

The display area determination unit 51a has a function for determining an area permitted for the projection of the light emitter 53, i.e., for determining the display-permitted area based on the driver seatbelt buckle signal, vehicle speed signal, passenger seat signal, passenger seatbelt buckle signal and ignition signal (not shown), and hands the determined content over to the mechanical part drive unit 51b.

The mechanical part drive unit 51b has a function for controlling the operation of the motor 52, i.e., for controlling the direction of projection of the light emitter 53 by sending a control signal to the motor 52 based on the drawing signal and on the display-permitted area determined by the display area determination unit 51a.

The light emitter drive unit 51c has a function for enabling the light emitter 53 to draw a figure or a light spot represented by a drawing signal by controlling the light emitter 53 based on the drawing signal.

Figure 4:
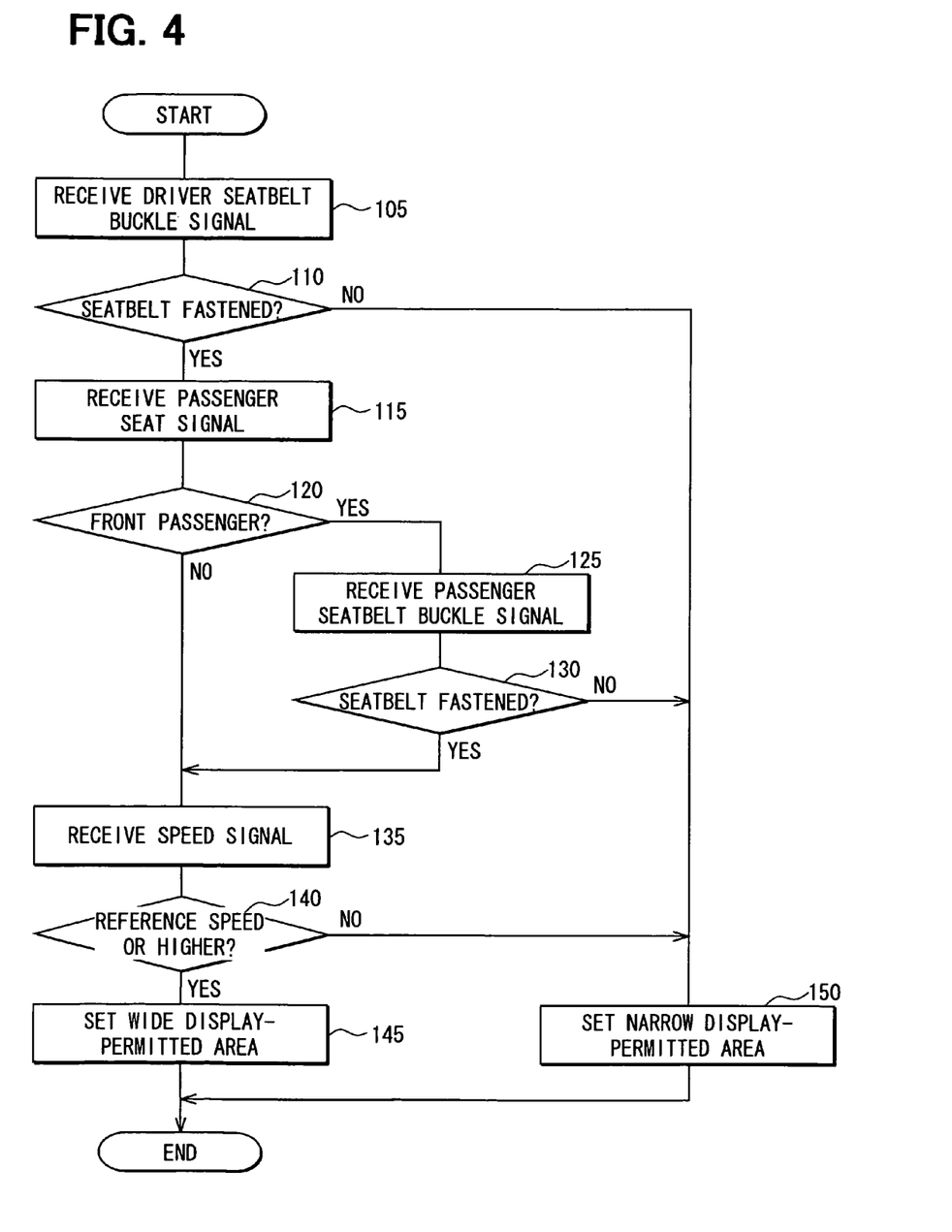
FIG. 4 is a flowchart of a processing executed by a control ECU to determine a display area in the first embodiment.

The control ECU, particularly the display area determination unit 51a, executes the processing of realizing the above function as shown in FIG. 4. The display area determination unit 51a executes the processing when the ignition of the vehicle is turned on. In this processing, the display area determination unit 51a, first, receives the driver seatbelt buckle signal at step 105, and, at step 110, checks whether the driver seatbelt has been fastened based on the driver seatbelt buckle signal that is received. If fastened, step 115 is executed. If not fastened, step 150 is executed.

The passenger seat signal is received at step 115. Next, at step 120, if a passenger is seated on the passenger seat is checked based on the passenger seat signal that is received. If the passenger is seated on the passenger seat, step 125 is executed. If no passenger is seated thereon, step 135 is executed.

At step 125, the passenger seatbelt buckle signal is received. Next, at step 130, whether the seatbelt on the passenger seat is fastened is checked based on the passenger seatbelt buckle signal that is received. If fastened, step 135 is executed. If not fastened; step 150 is executed.

The vehicle speed signal is received at step 135. Next, at step 140, if the received vehicle speed signal is a reference speed or higher is checked. The reference speed may be a predetermined value (e.g., 20 kilometers per hour, 5 kilometers per hour), or a value that varies depending upon the conditions or may be a value that varies at random within a predetermined range. Step 145 is executed if the received vehicle speed signal is the reference speed or higher. If the received vehicle speed signal is less than the reference speed, then step 150 is executed.

At step 145, the display-permitted area is set to a wide range of the two predetermined ranges. Specifically, the wide display-permitted area is set to be a region including both the upper front end portion 21 and the upper middle to rear portion 22. At step 150, the display-permitted area is set to the narrow range of the two predetermined ranges. Specifically, the narrow display-permitted area is limited to the upper front end portion 21 only. After step 145 or 150, the processing returns to step 105 again to repeat the above processing.

Through the above processing, the display area determination unit 51a continues to limit the display-permitted area to the narrow area, i.e., to the upper front edge portion 21 only so far as at least even any one of the following first to third conditions is satisfied. These conditions indicate that a driver or a passenger is allowed to move his or her body including head easily.

First condition: The driver seatbelt has not been fastened.
Second condition: A passenger is seated on the passenger seat but the passenger seatbelt has not been fastened.
Third condition: The vehicle speed is lower than the reference speed.

The control ECU 51 continues to set the display-permitted area to the wide area, i.e., to the region of a combination of the upper front end portion 21 and the upper middle to rear portion 22 so far as the following fourth, fifth and seventh conditions are all satisfied and so far as the following fourth, sixth and seventh conditions are all satisfied. These conditions indicate that a driver or a passenger is restricted from moving his or her body including head easily.

Fourth condition: The driver seatbelt has been fastened.
Fifth condition: A passenger is seated on the passenger seat and the passenger seatbelt has been fastened.

Sixth condition: No passenger is on the passenger seat.
Seventh condition: The vehicle speed is the reference speed or higher.

If the display-permitted area determined by the display area determination unit 51a is the wide area, the mechanical part drive unit 51b assumes a state capable of drawing on any area over the upper front end portion 21 and the upper middle to rear portion 22 depending upon the drawing signal.

Figure 5:
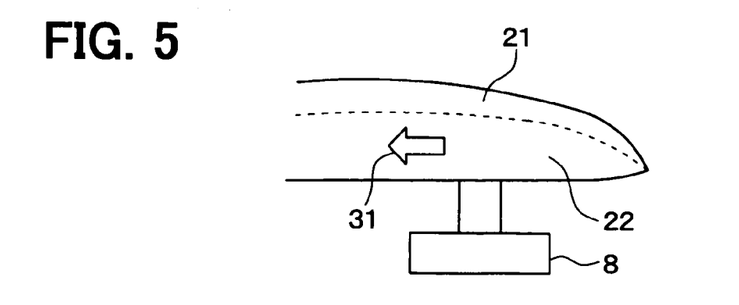
FIG. 5 is a top plan view schematically illustrating a position to which the visible laser beam is projected when expanding a display-permitted area and when turning to the left.

If, for example, the display-permitted area determined by the display area determination unit 51a is the wide area and the drawing signal is representing the turn to the left, the mechanical part drive unit'51b, as shown in FIG. 5, controls the direction of projection of the light emitter 53 via the motor 52 so that a left turn arrow 31 is displayed at a position, on the left side of a steering wheel 8 on, for example, the upper middle to rear portion 22.

Figure 6:
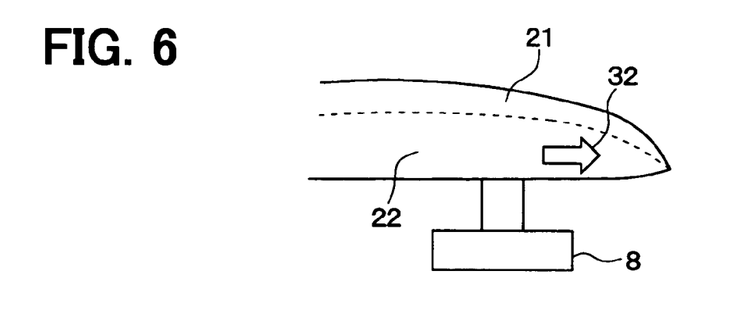
FIG. 6 is a top plan view schematically illustrating a position to which the visible laser beam is projected when expanding the display-permitted area and when turning to the right.

Further, if the display-permitted area determined by the display area determination unit 51a is the wide area and the drawing signal is representing the turn to the right, the mechanical part drive unit 51b, as shown in FIG. 6, controls the direction of projection of the light emitter 53 via the motor 52 so that a right turn arrow 32 is displayed at a position on the right side of the steering wheel 8 on, for example, the upper middle to rear portion 22.

Further, If the display-permitted area determined by the display area determination unit 51a is the narrow area, the mechanical part drive unit 51b assumes a state of projecting the visible laser beam onto the upper front end portion 21 only irrespective of the content of the drawing signal.

Figure 7:
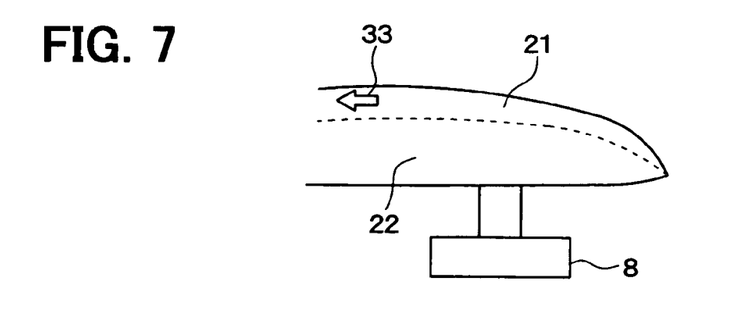
FIG. 7 is a top plan view schematically illustrating a position to which the visible laser beam is projected when contracting the display-permitted area and when turning to the left.

If, for example, the display-permitted area determined by the display area determination unit 51a is the narrow area and the drawing signal is representing the turn to the left, the mechanical part drive unit 51b, as shown in FIG. 7, controls the direction of projection of the light emitter 53 via the motor 52 so that a left turn arrow 33 is displayed at a position on the left side of the steering wheel 8 on the upper front end portion 22.

Figure 8:
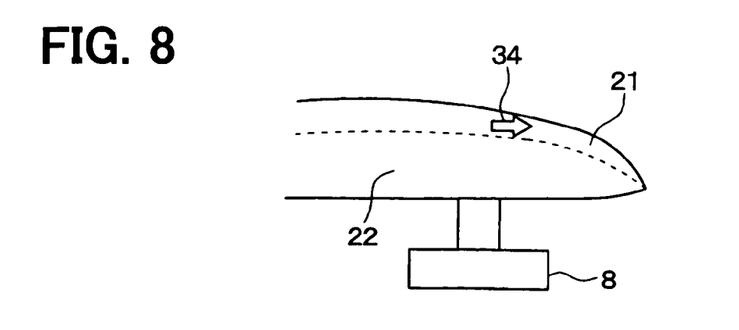
FIG. 8 is a top plan view schematically illustrating a position to which the visible laser beam is projected when contracting the display-permitted area and when turning to the right.

Further, if the display-permitted area determined by the display area determination unit 51a is the narrow area and the drawing signal is representing the turn to the right, the mechanical part drive unit 51b, as shown in FIG. 8, controls the direction of projection of the light emitter 53 via the motor 52 so that a right turn arrow 34 is displayed at a position on the right side of the steering wheel 8 on the upper front end portion 21.

Upon controlling the light emitter 53 based on the draw signal, further, the light emitter drive unit 51c draws arrow FIGS. 31, 33 indicating the right turn or the arrow FIGS. 32, 34 indicating the left turn at positions on the top surface of the instrument panel 6 to which the light emitter 53 is directed by the motor 52 as shown in FIGS. 5 to 8.

Information projected from the visible laser beam projector 5 onto the upper front end portion 21 or the upper middle to rear portion 22 may be stored in the control ECU 51 in advance at the time of, or prior to, installing the visible laser beam projector 5 on the vehicle.

As described above, the control ECU 51 expands the area onto where the visible laser beam is to be projected if it is determined that the driver seatbelt has been fastened, a passenger is seated on the passenger seat, the passenger seatbelt has been fastened and the traveling speed is higher than the reference speed. The control ECU 51, further, expands the area onto where the visible laser beam is to be projected if it is determined that the driver seatbelt has been fastened, no passenger is seated on the passenger seat and the traveling speed is higher than the reference speed.

When the vehicle is traveling, it becomes less probable that a passenger moves in the compartment than when the vehicle is not traveling. When the vehicle is traveling, therefore, the region expands where the human eyes are not adversely affected despite the visible laser beam of a high intensity is projected. As the vehicle speed increases, further, it becomes little probable that a passenger moves in the compartment. As the vehicle speed increases, therefore, the region is expanded where the human eyes are little probable to be adversely affected despite the visible laser beam of a high intensity is projected. Through the above operation, therefore, it is made possible to vary the range of projection depending upon the vehicle speed to maintain high the intensity of the visible laser beam while at the same time suppressing adverse effect of the visible laser beam on the human eyes.

Further, the passenger who is wearing the seatbelt on the driver seat or on the passenger seat is allowed to move in a limited range in the compartment. Therefore, when the passenger is wearing the seatbelt, the region increases where the human eyes are little probable to be adversely affected despite the visible laser beam of a high intensity is projected as compared to when the passenger is not wearing the seatbelt. Based on the above operation, therefore, the range of projection can be varied depending upon whether the seatbelt is being fastened so as to maintain high the intensity of the visible laser beam while. at the same time suppressing the probability of adverse effect of the visible laser beam on the human eyes.

Further, the control ECU 51 contracts the region to where the visible laser beam is to be projected in the first case where it is so determined that the driver seatbelt has not been fastened, in the second case where it is determined that the passenger is seated on the passenger seat and that the passenger seatbelt has not been fastened, and in the third case where it is so determined that the traveling speed is lower than the reference speed.

If even at least any one of the first to third conditions is satisfied as described above, the region to where the visible laser beam is to be projected is contracted to control the region to where the visible laser beam is to be projected depending upon a combined relationship of if the driver and the passenger on the passenger seat are wearing the seatbelts and the vehicle speed making it possible to maintain high the intensity of the visible laser beams while at the same time suppressing the probability of adverse effect of the visible laser beam on the human eyes maintaining reliability.

Further, with the display-permitted area being limited to within the upper front end portion 21, the passenger hardly looks at the source of visible laser beam, enhancing the safety for the passenger's eyes.

The covering 3 is arranged at a position same as or higher in position than the lower end of the inner mirror 2, and at a position lower than the position at which the visible laser beam is projected from the light emitter 53 maintaining a space therebetween. In this case, it never happens that the passenger's eyes are brought close to the light emitter 53 beyond the position of the covering 3. Therefore, even in case the passenger's eyes are brought into the optical path of the visible laser beam under the cover 3, the distance between the position where the visible laser beam is projected from the light emitter 53 and the passenger's eyes, i.e., the optical -path length of the visible laser beam, is maintained to be longer than a distance between the position of projection and the covering 3. The ratio of a change in the direction in which the visible laser beam is projected and a change in the position where the visible laser beam is projected, varies in proportion to the optical path length. Therefore, the longer the optical path length, the shorter the time in which the visible laser beam falls on the passenger's eyes. It is, therefore, made possible to maintain high the intensity of the visible laser beam while at the same time suppressing the probability of adverse effect of the visible laser beam on the human eyes.

Further, the bottom of the covering 3 is concealed by the inner mirror 2 as viewed from the driver. Therefore, the covering 3 does not hinder the driving operation of the driver.

Second Embodiment

Figure 9:
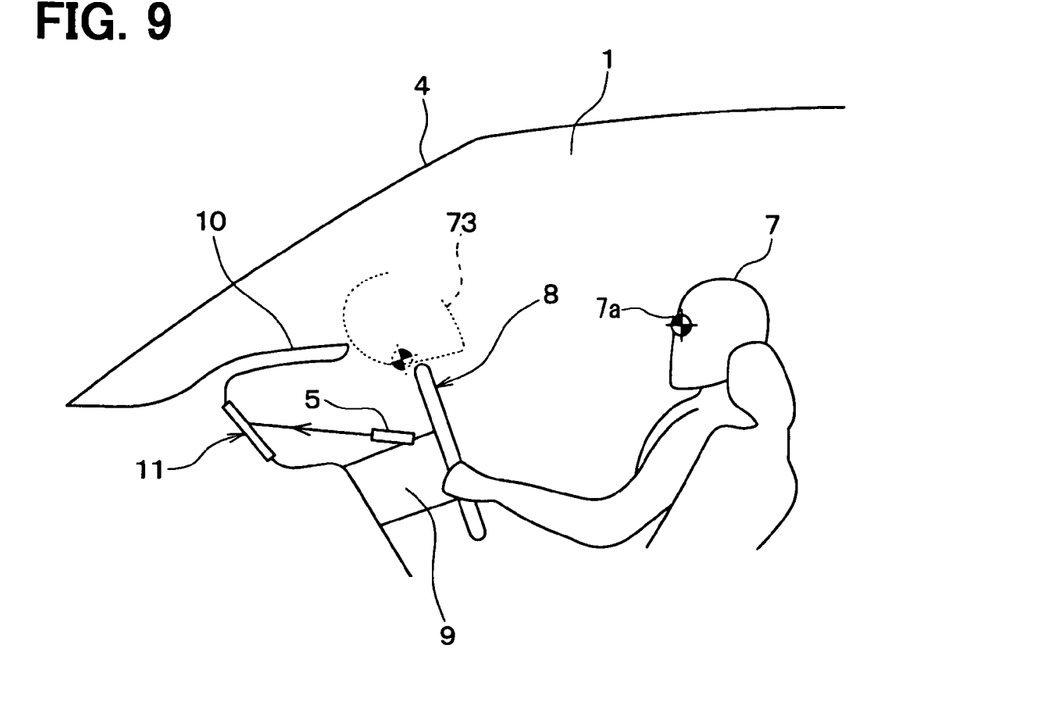
FIG. 9 is a side view schematically illustrating an arrangement of a visible laser beam projector in a passenger compartment according to a second embodiment of the present invention.

In a second embodiment shown in FIG. 9, the visible laser beam projector 5 is arranged on the upper surface of a steering column 9 that connects the steering wheel 8 to a vehicle chassis in the compartment 1. The visible laser beam projected from the visible laser beam projector 5 is limited to a meter display portion 11 where instruments are arranged in front of the driver seat.

Like in the first embodiment shown in FIGS. 3 and 4, the visible laser beam projector 5 operates based on the driver seatbelt buckle signal, vehicle speed signal, front passenger seat signal, front passenger seatbelt buckle signal and drawing signal, so as to widely set the display-permitted area in some cases and to narrowly set the display-permitted area in other cases, or to set the display-permitted area on a predetermined region on the meter display portion 11.

The visible laser beam is projected onto the meter display portion 11 from above the steering column 9. Therefore, there is almost no probability in that the human eyes enter into the optical path of the visible laser beam, and the probability of adverse effect on the passenger's retinas can be suppressed to a sufficient degree despite the output of the laser beam is increased.

Further, the arrangement of the light emitter 53 and the region to where the visible laser beam is projected from the light emitter 53 are limited within a partial space in the compartment 1 such that the optical path of the visible laser beam cannot enter into the partial space from space other than the partial space without deforming a sphere of a diameter of 17 cm (nearly equal to the head of an adult person).

This prevents any body of a size nearly equal to the human head from entering into the optical path of the visible laser beam as represented by a head 73 in FIG. 9. Therefore, the probability of adverse effect on the passenger's retinas can be suppressed to a sufficient degree despite the output of the visible laser beam is increased.

Third Embodiment

Figure 10:
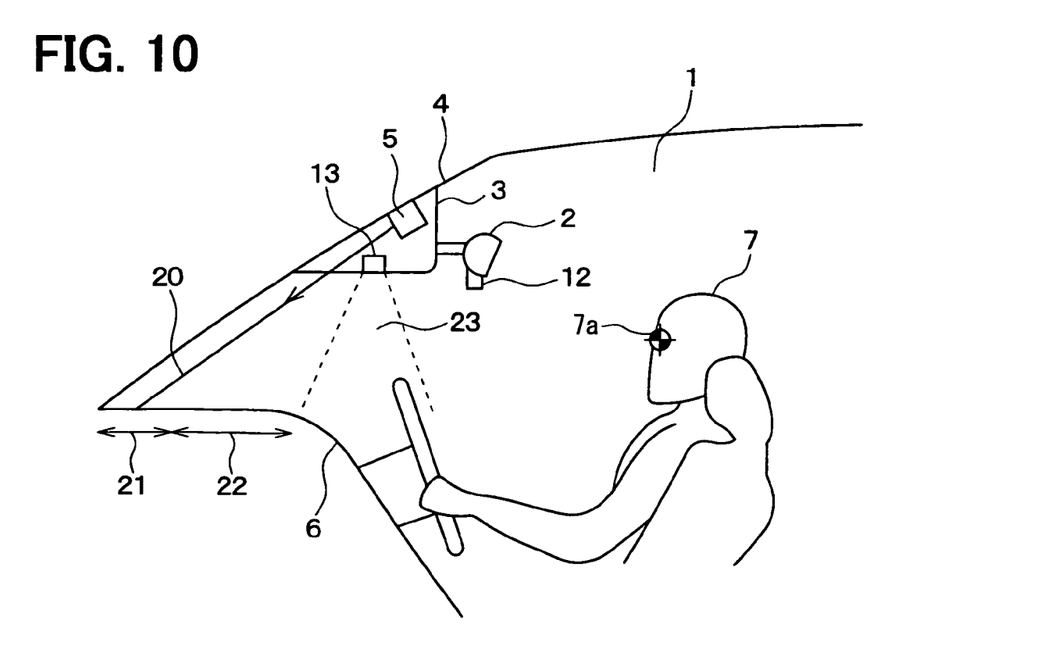
FIG. 10 is a side view schematically illustrating the arrangement of a visible laser beam projector in a passenger compartment according to a third embodiment of the present invention.

In a third embodiment shown in FIG. 10, the visible laser beam projector 5 is arranged at the same position in the compartment 1 as in the first embodiment (FIG. 1). In the third embodiment, however, a map light 12 is provided just under the inner mirror 2 to illuminate hands and vicinity thereof of the passengers on the front seats and that an approach sensor 13 is provided just on the bottom surface of the covering 3.

The approach sensor 13 detects a body inclusive of a man and a head that enters the detection region thereof and produces a detection signal responsive thereto. For example, the detection may be realized by using the approach sensor 13 detecting an amount of reflected light. The detection region of the approach sensor 13 is in a direction just under the approach sensor 13. This region lies between the optical path 20 of the visible laser beam and the driver or passenger when the region on which the visible laser beam is projected is limited to the region that includes the upper front end portion 21 and the upper middle to rear portion 22. Therefore, even if the driver or passenger approaches the optical path 20 moving from the seat, the approach sensor 13 detects the driver or passenger before he reaches the optical path 20.

Figure 11:
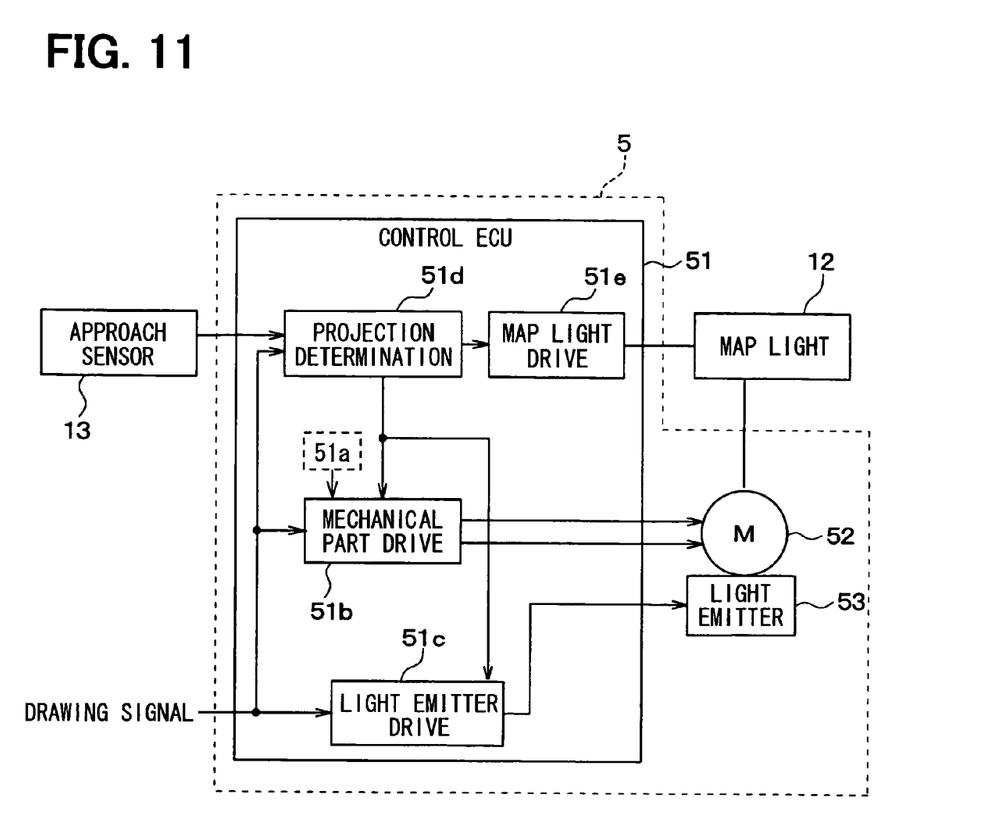
FIG. 11 is a block diagram illustrating the visible laser beam projector according to the third embodiment.

The visible laser beam projector 5 of this embodiment may be configured as shown in FIG. 11. The visible laser beam projector 5 includes the control ECU 51, motor 52 and light emitter 53. The motor 52 and the light emitter 53 are the same as those of the first embodiment. Here, however, the motor 52 changes the attitudes of not only the light emitter 53 but also of the map light 12 to move the detection range of the map light 12. Specifically, if the direction of the light emitter 53 moves toward the right and left on the upper surface of the instrument panel 6, the detection range of the map light 12 moves toward the right and left in tune therewith.

The control ECU 51 of this embodiment is provided with a projection determination unit 51d and a map light drive unit 51e. The control ECU 51 may or may not have the display area determination unit 51a.

Responsive to an instruction from the projection determination unit 51d, the map light drive unit 51e operates to control the turn-on and turn-off of the map light 12. Based on a detection signal from the approach sensor 13 and the same drawing signal as that of the first embodiment, the projection determination unit 51d checks whether the projection of the visible laser beam be permitted, and provides the determined result to the mechanical part drive unit 51b and the light emitter drive unit 51c.

Figure 12:
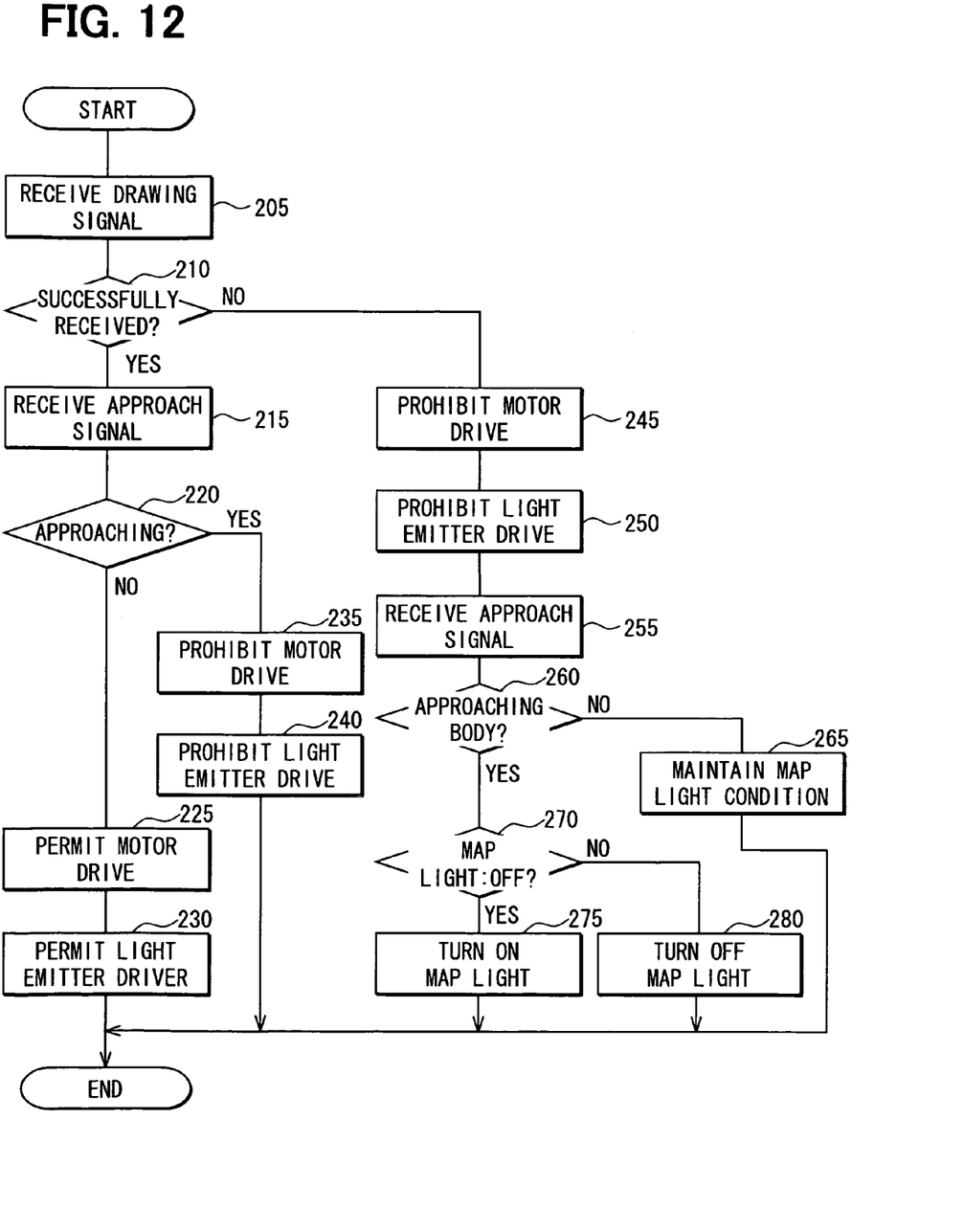
FIG. 12 is a flowchart of a processing executed by a control ECU to determine a laser beam projection area in the third embodiment.

The control ECU 51, particularly the projection determination unit 51d, executes the processing shown in FIG. 12 for realizing the above function. The projection determination unit 51d executes the processing when the ignition of the vehicle is turned on.

The projection determination unit 51d, first, receives the drawing signal at step 205, and checks at step 210 whether the drawing signal is successfully received, i.e., if the, drawing signal is present. If there is the drawing signal, step 215 is executed. If there is no drawing signal, step 245 is executed.

At step 215, an approach sensor signal is received from the approach sensor 13. Next, at step 220, it is checked whether the approach sensor 13 has detected any body that has approached. If the body is approaching, step 235 is executed. If no body is approaching, step 225 is executed.

At step 235, an instruction for prohibiting or stopping the operation of the motor 52 is provided to the mechanical part drive unit 51b. At next step 240, an instruction for prohibiting the operation of the light emitter 53 is provided to the mechanical part drive unit 51b. Responsive to the above instructions, the mechanical part drive unit 51b and the light emitter drive unit 5k halt the motor 52 and the light emitter 53, prohibiting the drive of the motor 52 and the projection of visible laser beam from the light emitter 53.

At step 225, an instruction for permitting the operation of the motor 52 is provided to the mechanical part drive unit 51b. At next step 230, an instruction for permitting the operation of the light emitter 53 is provided to the light emitter drive unit 51c. In response to the above instructions, the mechanical part drive unit 51b and the light emitter drive unit 51c drive the motor 52 and the light emitter 53 depending upon the drawing signal to project the visible laser beam in order to draw a figure corresponding to the drawing signal at a position corresponding to the drawing signal.

At steps 245, 250 and subsequent steps after having determined that there is no drawing signal, the drive of motor 52 is stopped or prohibited and the projection of visible laser beam from the light emitter 53 is prohibited by the same processing as those of steps 235 and 240.

At step 260 and subsequent steps, the projection determination unit 51d provides an instruction to the map light drive unit 51e and turns on the map light 12 at step 275, if the map light 12 has been turned off (YES at step 270) when the body has approached the detection range of the approach sensor 13 (YES at step 260), and turns off the map light 12 at step 280 if the map light 12 has not been turned off (NO at step 270). If no body is approaching the detection range of the approach sensor 13 (NO at step 260), the map light 12 is maintained to stay in the present condition of being turned on or off at step 265. After steps 230, 240, 265, 275 and 280, the processing returns to step 205 again to repeat the above processing.

Upon executing the above processing by the projection determination unit 51d, the control ECU 51, depending upon the presence of the drawing signal (steps 205, 210), uses the approach sensor 13 as an on/off switch for projecting or not projecting the visible laser beam when there is the drawing signal and uses the approach sensor 13 as the on/off switch for operating or not operating the map light 12 which is a device other than the visible laser beam projector 5 when there is no drawing signal. When the light emitter 53 is not being used, the approach sensor 13 is used as the on/off switch for the other device to lower the cost of production as a result of using the approach sensor 13 in common. The approach sensor 13 may be used not only for the map light 12 but for any other device than the visible laser beam projector 5.

When there is the drawing signal, further, the control ECU 51 checks whether the body is entering the optical path based on a detection signal output from the approach sensor 13, and prohibits the projection of the visible laser beam from the projector if the check result is affirmative. Accordingly, the intensity of the visible laser beam of the light emitter 53 is suppressed before the passenger's eyes enter the optical path, decreasing the probability in that an intense visible laser beam falls on the user's eyes. Further, the intensity of the visible laser beam of the light emitter 53 is suppressed before a reflector is placed in the optical path decreasing the probability in that the visible laser beam reflected by the reflector falls on the user's eyes. Further, when the upper display by the visible laser beam is not necessary, the passenger can intentionally put his or her hand on the detection region of the approach sensor 13 to interrupt the projection of the visible laser beam.

Further, the control ECU 51 can change the direction in which the visible laser beam is projected and can change the direction of detection by the approach sensor 13 following the change in the direction in which the visible laser beam is projected. Therefore, the detection range of the approach sensor 13 varies in compliance with the change in the direction of projection by the light emitter 53, making it possible to contract the area that can be detected at one time by the approach sensor 13. Further, the detection of the area without wasteful area helps prevent erroneous detection by the approach sensor 13.

The approach sensor 13 outputs a detection signal in case the body has entered in the region between the passenger and the region to which the visible laser beam is projected from the light emitter 53. By setting the detection region of the approach sensor 13 to be the region between the passenger and the region to which the visible laser beam is projected from the light emitter 53 as described above, it is possible to prevent that the visible laser beam falls on the passengers eyes as a result that the passenger or the reflector has entered into the region to which the visible laser beam is projected from the light emitter 53. Further, since the region to which the visible laser beam is projected from the light emitter 53 is different from the detection region of the approach sensor 13, it is possible to also utilize the approach sensor 13 as an on/off switch for the devices other than the visible laser beam projector 5.

Fourth Embodiment

Figure 13:
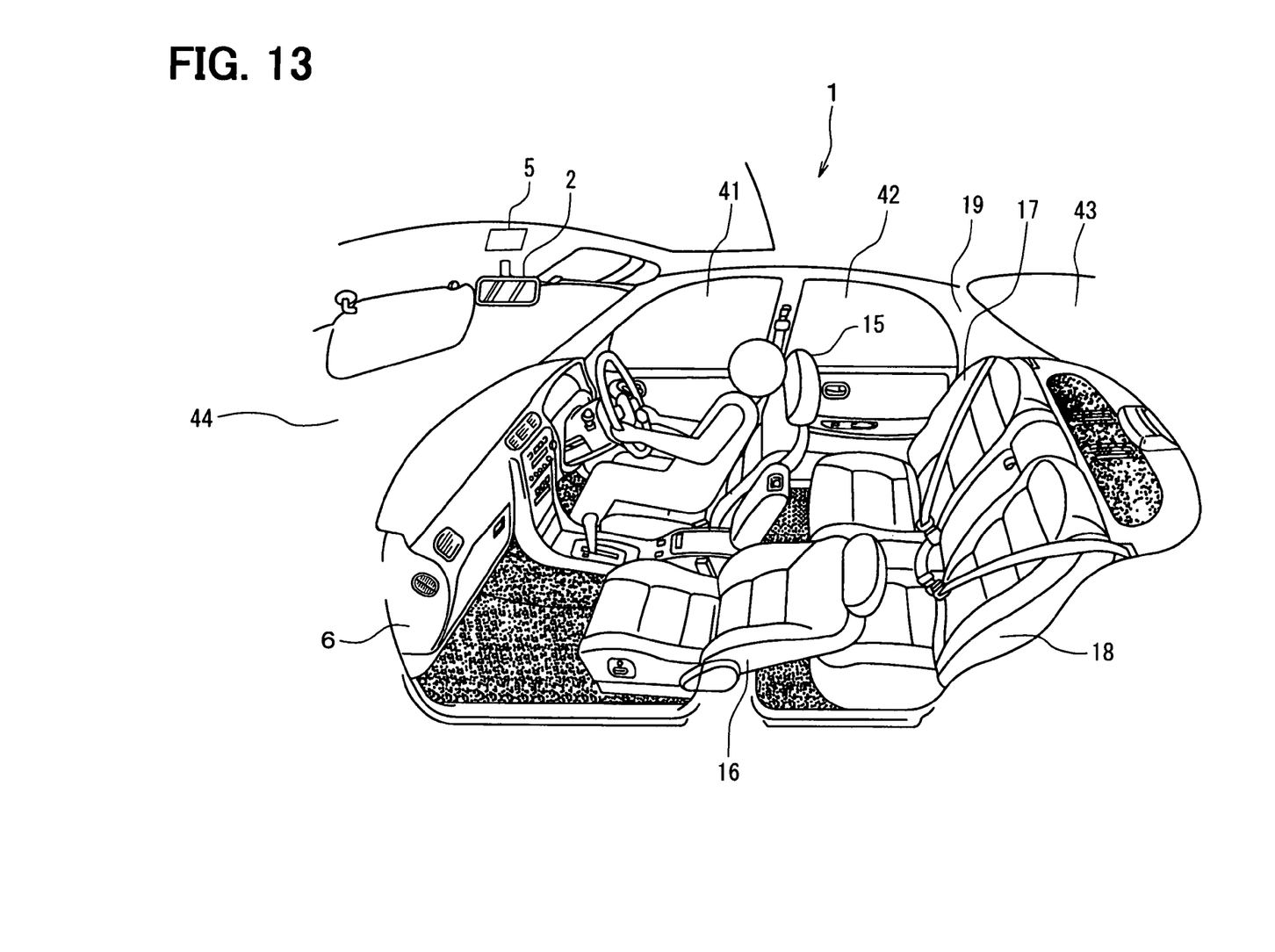
FIG. 13 is a perspective view schematically illustrating an arrangement of a visible laser beam projector in a passenger compartment according to a fourth embodiment of the present invention.

In a fourth embodiment shown in FIG. 13, the visible laser beam projector 5 is mounted on a front end portion of a ceiling of the compartment 1 at the center in the right-and-left direction. The configuration of the visible laser beam projector 5 of this embodiment is the same as that of the first embodiment shown in FIG. 3. Here, however, the signals which the display area determination unit 51a receives are the signals from the seat sensors provided in seats 15 to 18 of the vehicle. The seat sensors may be the same as the seat sensor for the passenger seat of the first embodiment. Further, the processing executed by the display area determination unit 51a is not the one shown in FIG. 4 but is the one as described below.

That is, whether if the passengers are seated on the seats 15 to 18 is detected based on the signals from the seat sensors of the seats, and the display-permitted area is varied depending upon whether the passengers are seated and are not seated.

For example, if it is determined that no passenger is seated on the passenger seat, the instrument panel 6 on the side of the passenger seat and the passenger seat 16 are included in the display-permitted area: If the passenger is sealed on the passenger seat, the instrument panel 6 on the side of the passenger seat and the passenger seat 16 are excluded from the display-permitted area.

Further, if, for example, the passenger is seated on neither the front passenger seat nor the rear passenger seat, the display-permitted area includes the passenger. seat 16, left rear seat 18 and left rear pillar (rear pillar on the side opposite to the right rear pillar 19). If the passenger is seated on either the passenger seat or the rear seat, the display-permitted area excludes the passenger seat 16, left rear seat 18 and left rear pillar (rear pillar on the side opposite to the right rear pillar 19).

As described above, the light emitter 53 checks whether the passenger is seated on the seat of the vehicle. If it is determined that no passenger is seated, the visible laser beam of the light emitter 53 is projected onto the seat or near the seat. If it is determined that the passenger is seated, the visible laser beam of the light emitter 53 is prohibited from being projected onto the seat or near the seat.

As described above, projection of the visible laser beam onto the seat or near thereto is prohibited or enabled depending upon if the passenger is seated on the seat. If the passenger is seated on the seat, the visible laser beam is not projected onto the seat to lower the probability of adverse effect on the passenger's retinas. If no passenger is seated on the seat, the visible laser beam is projected onto the seat to provide information by effectively utilizing the space where no passenger is present. Therefore, the intensity of the visible laser beam can be maintained high while at the, same time suppressing the probability of adverse effect of the visible laser beam on the human eyes.

The display area determination unit 51a excludes glasses 41 to 44 of the vehicle and the mirror surface of the inner mirror 2 from the display-permitted area.

Information from the visible laser beam projector 5 in the directions toward the positions of the seats, positions of the pillars, positions of the glasses 41 to 44 and position of the mirror surface of the inner mirror 2 may be stored in the control ECU 51 in advance at the time of, or prior to installing the visible laser beam projector 5 on the vehicle.

As described above, the control ECU 51 is storing information related to the positions of the glasses and the mirror surface in the compartment, and prohibits the projection of the visible laser beam from the projector onto the glasses and the mirror surface based on the stored information related to the positions.

It is therefore made possible to lower such a probability that the visible laser beam falls on the eyes of persons outside of the vehicle passing through the glass. This further lowers such a probability that the visible laser beam is reflected by the mirror surface to fall on the eyes of persons inside and outside of the vehicle. It is, therefore, made possible to maintain high the intensity of the visible laser beam while at the same time suppressing the probability of adverse effect of the visible laser beam on human eyes.

Fifth Embodiment

In a fifth embodiment, the visible laser beam projector 5 may change the position to which the visible laser beam is to be projected by controlling the motor 52 or the light emitter 53 by the control ECU 51, and intensifies the visible laser beam projected from the light emitter 53 as the rate of change increases in the above first to fourth embodiments.

Therefore, even in case the visible laser beam happens to fall on the human eyes; the visible laser beam falling on the eyes has suppressed energy. For example, in order for the visible laser beam that has happened to fall on the human eyes not to exceed an exposure radiation limit of class 1, the exposure radiation limit'of class 1 is $7 \times 10 \times t1^{0.75}/t1$ watts if the time in which the visible laser beam is falling on the human eyes is t1.

From the above formula, therefore, the permissible power becomes 2.2 milliwatts (mW) if the position on which the visible laser beam is projected is moving across the human eyes (about 7 mm in diameter) at a speed of 10 milliseconds (first speed). From the above formula, further, the permissible power becomes 1.2 mW if the position on where the visible laser beam is projected is moving across the human eyes at a speed of 100 milliseconds (second speed).

Therefore, the power of the visible laser beam projected from the visible laser beam projector 5 may, for example, be 2 mW in the case of the first speed and may be 1 mW in the case of the second speed which is slower than the first speed.

Here, the control ECU 51 may specify the rate of change in the position of the projected object as a value obtained by multiplying a change in the direction of projection by a predetermined reference distance (e.g., a distance from the visible laser beam projector 5 to the upper front end portion 21 in FIG. 1, a distance from the visible laser beam projector 5 to the meter display portion 11 in FIG. 9, or a distance from the visible laser beam projector 5 to the passenger seat 16 in FIG. 13).

As described above, the control ECU 51 intensifies the visible laser beam projected from the light emitter 53 as the rate increases for changing the direction of the visible laser beam projected from the light emitter 53. Therefore, if the rate of changing the direction of projection decreases, the probability increases in that the visible laser beam continuously falls on the human eyes for an increased period of time. In this case, the intensity of projection is decreased. It is, therefore, made possible to suppress the amount of energy of the visible laser beam falling on the eyes. Further, if the rate of changing the direction of projection, increases, the probability decreases in that the visible laser beam continuously falls on the human eyes for an increased period of time. In this case, the intensity of projection is increased. It is therefore made possible to maintain high the intensity of the visible laser beam while at the same time suppressing the probability of adverse effect of the visible laser beam on the human eyes.

In the above embodiment, the light emitter 53 corresponds to the projector, the control ECU 51 corresponds to a control unit, the approach sensor 13 corresponds to an optical path interception detector, and the covering 3 corresponds to a plate member.

Further, the control ECU 51 operates as seatbelt check means by executing step 110 or 130 of the program 100, operates as region expansion means by executing step 145, operates as passenger seat passenger check means by executing step 120, operates as passenger seatbelt check means by executing step 130, works as driver seatbelt check means by executing step 110, operates as vehicle speed check means by executing step 140, and operates as region contraction means by executing step 150.

The control ECU 51 further operates as optical path interception check means by executing step 220 of the program 200, and operates as projection suppressing means by executing step 235 or 240.

Other Embodiments

It should be noted that the present invention is not limited to the above embodiments only but encompasses various forms for realizing functions of particular matters of the invention.

For example, while the visible laser beam is being projected from the light emitter 53, the control ECU 51 may change the direction in which the visible laser beam is projected at all times. In this case, the object to which the visible laser beam is projected does not stay at the same place. Even if the visible laser beam happens to fall on the human eyes, therefore, it does not last long. It is therefore made possible to maintain high the intensity of the visible laser beam while at the same time suppressing the probability of adverse effect of the visible laser beam on the human eyes.

Further, the control ECU 51 may change the direction of projection of the visible laser beam at all times when the intensity of the visible laser beam projected by the projector is set to a first intensity, and may not change the direction of projection of the visible laser beam when the intensity of the visible laser beam is set to a second intensity which is weaker than the first intensity.

When the intensity of the visible laser beam is high, therefore, the position of the object to which the visible laser beam is projected does not stay at the same place. Even if the visible laser beam happens to fall on the human eyes, therefore, it does not last long. It is therefore made possible to maintain high the intensity of the visible laser beam while at the same time suppressing the probability of adverse effect of the visible laser beam on the human eyes.

Further, when a portion (e.g., particular seat, steering wheel, particular door, particular instrument) is instructed for offering information to the passenger, the control ECU 51 may change the direction of projection of the visible laser beam at all times so that the position of the object to which the visible laser beam is projected changes at all time within the one place. The position of the projected object can be changed at all times within the one place by, for example, so controlling the direction of projection that a light spot of the visible laser beam follows the circumference of the one place.

When one place in the vehicle is specified by the visible laser beam, therefore, the position of the object to which the visible laser beam is projected does not stay at the same place. Even if the visible laser beam happens to fall on the human eyes, therefore, it does not last long. It is therefore made possible to maintain high the intensity of the visible laser beam while at the same time suppressing the probability of adverse effect of the visible laser beam on the human eyes.

Further, the projector does not have to emit light by itself (i.e., does not have to generate the visible laser beam) but may project the visible laser beam generated elsewhere to the object to be projected. For example, a light-generating unit for generating the visible laser beam may be mounted on other portion of the vehicle (e.g., rear part of the vehicle), the visible laser beam generated by a light-generating unit may be transmitted to the projector through an optical cable, and the projector may reflect the visible laser beam transmitted through the optical cable by a mirror, so that the visible laser beam is projected onto the object.

The detection range of the optical path interception determination portion may be in agreement with the projection range of the visible laser beam. In this case, it can be so contrived that the projection of the visible laser beam is readily interrupted in case the visible laser beam has fallen on the human eyes, and the projection of the visible laser beam is readily interrupted in case an obstacle is placed in the projection range of the visible laser beam and the visible laser beam is reflected. The control ECU 51 may be located very apart from the projector 53.

In the first embodiment, further, the display-permitted area of the visible laser beam projector 5 may be limited on the upper front end portion 21 of the instrument panel 6 at all times. Then, the visible laser beam is projected over an area from a position in front of the inner mirror of the vehicle up to the front end on the upper surface of the instrument panel in the compartment. Therefore, there is almost no probability in that the human eyes enter into the optical path of the visible laser beam. Therefore, the probability of adverse effect on the passenger's retinas can be suppressed to a sufficient degree despite the output of the visible laser beam is increased.

Therefore, the visible laser beam is projected over the area from the position in front of the inner mirror up to the front end portion of the instrument panel of the vehicle in the compartment. Since there is almost no probability in that the human eyes enter into the optical path of the visible laser beam, it is allowed to sufficiently suppress the probability of adverse effect on the passenger's retinas even when the output of the visible laser beam is increased.

In the third embodiment, further, the approach sensor 13 may be replaced by a camera that takes images of the optical path or the vicinity thereof. In this case, the control ECU 51 may so determines that a body has entered or is entering in the optical path if the image taken by the camera has changed from the reference image by a reference index or more, using a known image resolution method. Here, the reference image may be an image taken by the camera in a state where there is no obstacle readily after the camera is installed in the compartment 1. Further, whether the change is the reference index or more may be checked based on whether if the degree of agreement between the image that is taken and the reference image is a predetermined score or less. As the degree of agreement, the image that is taken and the reference image are transformed into a binary form, and the pixels at the corresponding positions are all compared for the two images in the binary form. Then, a value that increases with an increase in the number of pixels having the same value may be used to represent the degree of agreement.

Further, the arrangement of the light emitter 53 and the region to which the visible laser beam is projected from the light emitter 53 are limited within a partial space in the compartment 1 which is such that the optical path of the visible laser beam cannot enter into the partial space from space other than the partial space without deforming a sphere of a diameter of 14 cm (nearly equal to the size of head of an infant). This almost eliminates the probability in that the visible laser beam may happen to inadvertently fall on the infant's eyes.

Like the covering 3 of the above embodiments, a plate member of this embodiment may cover the bottom surface and the side surfaces of the light emitter 5, or may be present on the bottom surface only of the light emitter 5. The plate member is made from a material that permits the transmission of the visible laser beam projected from the projector, and may be positioned under the projector spaced apart therefrom in the optical path of the visible laser beam from the projector.

In the above embodiments, further, the functions realized by executing the programs by the control unit 51 may further be realized by using a hardware having such functions (e.g., an FPGA capable of programming the circuit constitutions).

What is claimed is:

1. A visible laser beam projector comprising:
   a projector for projecting a visible laser beam onto a portion of a vehicle in a compartment of the vehicle;
   a control unit for controlling a mode of projecting the visible laser beam to provide information to passengers in the compartment, wherein the control unit includes seatbelt check means for checking whether a seatbelt of the vehicle has been fastened; and
   region expansion means for expanding a region of an object to which the visible laser beam is projected to be of a first size when the seatbelt check means determines that the seatbelt has been fastened and to be of a second different size when the seatbelt check means determines that the seatbelt has not been fastened.

2. The visible laser beam projector according to claim 1, wherein said first and second sizes each include a width dimension, the width dimension of said first size being larger than the width dimension of said second size.

3. The visible laser beam projector according to claim 2, wherein:
   the region expansion means sets the width dimension of the first size to include an area of an upper or top surface of an instrument panel over an upper front end portion, which is close to a windshield, and an upper middle to rear portion; and
   the region expansion means sets the second size width dimension more narrowly to limit the region within an upper front edge portion of the instrument panel.

4. A visible laser beam projector comprising:
   a projector for projecting a visible laser beam onto a region of a vehicle compartment;
   a control unit for controlling a direction of projecting the visible laser beam to provide information to at least one occupant in the compartment, wherein the control unit includes seatbelt check means for checking whether a seatbelt of the vehicle has been fastened;
   region expansion means for expanding said region of an object to which the visible laser beam is projected when the seatbelt check means determines that the seatbelt has been fastened,
   wherein said control unit includes:
   passenger check means for checking whether a passenger is seated on a front passenger seat of the vehicle;
   passenger seatbelt check means for checking whether a passenger seatbelt of the front passenger seat has been fastened;
   the region expansion means expands said region when the passenger check means determines that the passenger is seated on the front passenger seat, and the passenger seatbelt check means determines that the passenger seatbelt of the front passenger seat has been fastened;
   driver seatbelt check means for checking whether a driver seatbelt of a driver seat has been fastened;
   vehicle speed check means for checking whether a traveling speed of the vehicle is higher than a reference speed;
   the region expansion means expands said region, on additional condition that the driver seatbelt check means determines that the driver seatbelt has been fastened and the vehicle speed check means determines that the traveling speed is higher than the reference speed; and
   region contraction means for contracting said region in a first case where the drivers seatbelt check means determines that the driver seatbelt has not been fastened, in a second case where the passenger check means determines that the passenger is seated on the front passenger seat and the seatbelt check means determines that the passenger seatbelt of the front passenger seat has not been fastened, and in a third case where the vehicle speed check means determines that the traveling speed is lower than the reference speed,
   wherein the region expansion means further expands said region, when the driver seatbelt check means determines that the driver seatbelt has been fastened, the passenger check means determines that no passenger is seated on the front passenger seat, and the vehicle speed check means determines that the traveling speed is higher than the reference speed.

* * * * *